(12) United States Patent
Hoskins

(10) Patent No.: US 9,470,335 B2
(45) Date of Patent: Oct. 18, 2016

(54) VALVE FOR DRINKING CONTAINER

(71) Applicant: Matt Hoskins, Bend, OR (US)

(72) Inventor: Matt Hoskins, Bend, OR (US)

(73) Assignee: TSI Manufacturing, LLC, Bend, OR (US)

( * ) Notice: Subject to any disclaimer, the term of this patent is extended or adjusted under 35 U.S.C. 154(b) by 121 days.

(21) Appl. No.: 14/533,990

(22) Filed: Nov. 5, 2014

(65) Prior Publication Data

US 2015/0122358 A1 May 7, 2015

Related U.S. Application Data

(60) Provisional application No. 61/900,582, filed on Nov. 6, 2013.

(51) Int. Cl.
  *F16K 31/58* (2006.01)
  *F16K 27/02* (2006.01)
  *F16K 1/00* (2006.01)

(52) U.S. Cl.
  CPC ............. *F16K 31/58* (2013.01); *F16K 1/00* (2013.01); *F16K 27/02* (2013.01); *Y10T 137/87917* (2015.04)

(58) Field of Classification Search
  CPC .......... F16K 31/58; F16K 27/02; F16K 1/00; Y10T 137/87917
  USPC .................. 137/613; 251/318, 319
  See application file for complete search history.

(56) References Cited

U.S. PATENT DOCUMENTS

| 2,755,974 A | 7/1956 | Godfrey |
| 2,797,837 A | 7/1957 | Roberts |
| 3,128,000 A | 4/1964 | Haberle |
| 4,531,655 A | 7/1985 | Putnam |
| 4,775,081 A | 10/1988 | Morane |
| 4,830,227 A | 5/1989 | Ball et al. |
| 5,297,686 A | 3/1994 | Takeuchi |
| 5,505,345 A | 4/1996 | Zeid |
| 6,039,305 A | 3/2000 | Hoskins et al. |
| 6,276,560 B1 | 8/2001 | Belcastro |
| 7,097,078 B2 | 8/2006 | Sanchez |
| 7,341,097 B2* | 3/2008 | Darby .............. F01P 11/0276 137/551 |
| 7,464,837 B2 | 12/2008 | Hoskins |
| 7,533,783 B2 | 5/2009 | Choi et al. |

(Continued)

FOREIGN PATENT DOCUMENTS

| CH | 276694 | 11/1951 |
| DE | 1141555 | 12/1962 |

(Continued)

*Primary Examiner* — Kevin Lee
(74) *Attorney, Agent, or Firm* — Klarquist Sparkman, LLP

(57) ABSTRACT

Disclosed valves for drinking from a portable fluid container allow for manual actuation of the valve between an open configuration that permits fluid flow and a closed configuration that substantially prevents fluid flow. Disclosed valves comprise a valve housing having inner bore fluidly coupled to an inflow channel and an outflow channel that are angled with respect to one another, and a reciprocating valve member that is adjustably positioned partially within the bore to open and close the fluid flow pathway through the bore from the inflow channel to the outflow channel. The reciprocating valve member is shaped such that it can prevent fluid flow when fully inserted within the bore to a closed configuration, and can allow fluid flow when the valve member is retracted from this closed position by a relatively short distance to an open configuration.

20 Claims, 4 Drawing Sheets

(56) References Cited

U.S. PATENT DOCUMENTS

| | | |
|---|---|---|
| 7,648,038 B2 | 1/2010 | Brozell |
| 7,931,175 B2 | 4/2011 | Hjort |
| 8,152,138 B2 * | 4/2012 | Skillern ............... A45F 3/16 |
| | | 251/342 |
| 8,336,724 B2 | 12/2012 | Yamashita et al. |
| 8,376,173 B2 | 2/2013 | Britto et al. |
| 8,602,238 B2 | 12/2013 | El-Saden et al. |
| 8,646,658 B2 | 2/2014 | Bae |
| 9,079,205 B2 | 7/2015 | Hoskins |
| 2012/0273074 A1 * | 11/2012 | Yamada et al. ........... F16K 1/00 |
| | | 137/614 |
| 2013/0175302 A1 | 7/2013 | Sariu |
| 2015/0196148 A1 | 7/2015 | Hoskins |

FOREIGN PATENT DOCUMENTS

| | | |
|---|---|---|
| GB | 387446 | 2/1933 |
| JP | 3524649 | 3/1997 |

* cited by examiner

VALVE FOR DRINKING CONTAINER

CROSS REFERENCE TO RELATED APPLICATION

This application claims the benefit of U.S. Provisional Application No. 61/900,582, filed on Nov. 6, 2013, which is hereby incorporated by reference in its entirety.

FIELD

This disclosure is related to valves for drinking containers.

BACKGROUND

Sufficient hydration is important for replacing bodily fluids during periods of aerobic activity, such as during cycling. A person engaged in aerobic activity could stop the aerobic activity and take a drink, such as at aid stations. However, this disrupts the aerobic activity and is not well suited for events like competitive cycling races.

It is desirable to make replenishment fluid available without the need to slow or stop aerobic activity. Water bottles carried by persons engaged in aerobic activity represent an attempt to overcome the problems associated with aid stations. However, water bottles can be awkwardly shaped and at least one hand is required for as long as one is drinking from the water bottle. Therefore, the use of water bottles can present safety hazards to cyclists and other active individuals.

In an attempt to overcome the deficiencies of water bottles, hydration systems have been developed that include a flexible reservoir for holding fluid, a flexible tube for conveying the fluid from the reservoir to the person engaged in aerobic activity, and a valve, such as a mouth operated "bite valve," attached to the end of the tube. In the case of a bite valve, when it is desired to replenish fluids, the person engaged in aerobic activity places the outlet of the valve in his or her mouth and bites down on a flexible valve covering. The valve covering deforms and is taken out of sealing engagement with an internal valve member, and fluid from the reservoir flows into the person's mouth. However, bite valves can be subject to wear as the flexible portion (typically made of polymeric material) tends to weaken over extended use. If weakened, the valves may experience difficulty in maintaining a closed position when the biting force is removed. Furthermore, in some situations, a user may be wearing a mouthpiece (such as for protection of the tongue) that prevents operation of a bite valve.

For at least these reasons, there is a need in the field for an alternative, or additional, means of opening and closing the fluid flow path from the drinking container, to controllably allow flow of fluid while preventing undesired leakage.

SUMMARY

Disclosed herein are embodiments of valves for drinking containers include a manually actuatable mechanism for opening and closing a valve member to better regulate the flow of fluid from the container. In some embodiments, the disclosed valves can be in series with a downstream bite valve, providing additional control over the fluid flow.

In disclosed embodiments, the valve comprises a housing and a valve member adjustably coupled to the housing. The housing comprises a fluid inlet, a bore having a lower chamber and an upper chamber, and a fluid outlet. The fluid inlet, the bore lower chamber, and the bore upper chamber are aligned along a central axis, and the fluid outlet extends laterally from the bore upper chamber in a direction transverse to the central axis. The bore upper chamber is larger in diameter than the bore lower chamber, and the bore lower chamber may be larger in diameter than the fluid inlet. The bore upper chamber has an open upper end for receiving the valve member. The valve member comprises a lower body having a lower sealing member sized to seal within the bore lower chamber, and the valve member comprises an upper body having an upper sealing member sized to seal within the bore upper chamber. The valve member is adjustable relative to the housing in the directions of the central axis between an open position and a closed position. When the valve member is in the closed position, the lower sealing member is in sealing contact with the bore lower chamber, such that fluid entering the fluid inlet cannot flow through the bore lower chamber into the bore upper chamber or into the fluid outlet. When the valve member is in the open position, the upper sealing member is in sealing contact with the bore upper chamber while the lower sealing member is positioned above the bore lower chamber and in the bore upper chamber, such that fluid can flow from the fluid inlet, through the bore lower chamber, through the bore upper chamber around the lower sealing member, and into the fluid outlet, but fluid is prevented from leaking through the open upper end of the bore upper chamber.

In some embodiments, the valve member further comprises an arm extending from the upper body outside of the housing, and the arm is engagable with an outer surface of the housing in at least two different positions, including a first position to hold the valve member in the closed position, and a second position to hold the valve member in the open position. The valve member can be moved from the open position to the closed position by pressing down on the valve member in a direction of the central axis, and the valve member can be moved from the closed position to the open position by lift or pushing up on the arm to disengage the arm from the outer surface of the housing. The arm and the outer surface of the housing comprise interfitting engagement features that allow the arm to engage with the housing and hold the valve body relative to the housing in the open position and the closed position. The housing and the arm can include interfering features that prevent the valve member from being removed from the housing absent substantial deformation of the arm or the housing.

In some embodiments, the upper sealing member comprises an O-ring seated in an annular recess in the upper body, and the lower sealing member comprises an O-ring seated in an annular recess in the lower body.

In some embodiments, the lower body of the sealing member comprises a tapered or beveled valve disk at a lower end of the lower body, and when the valve member is in the closed position the valve disk covers or seals off an upper end of the fluid inlet where the fluid inlet joins with the bore lower chamber.

In some embodiments, when the valve member is in the closed position, a lateral wall of the upper body below the upper sealing member blocks the fluid outlet at an aperture where the bore upper chamber joins with the fluid outlet.

In some embodiments, a bite valve in mounted on or adjacent to the fluid outlet and the bite valve operative in series with the adjustable valve member to regulate fluid flow. The bite valve can comprise a rigid stem and a flexible sheath mounted around the stem, such that the sheath seals against the stem in a natural state to block fluid flow out of the fluid outlet, and such that the sheath separates from the stem to allow fluid flow out of the fluid outlet when a user bites down on the sheath.

In some embodiments, the valve member moves only a small distance in the axial direction between the open position and the closed position. For example, the small distance can be less than a radius of the bore upper chamber and/or less than a diameter of the bore lower chamber.

The foregoing and other objects, features, and advantages of the disclosed technology will become more apparent from the following detailed description, which proceeds with reference to the accompanying figures.

DETAILED DESCRIPTION

Figure 2:
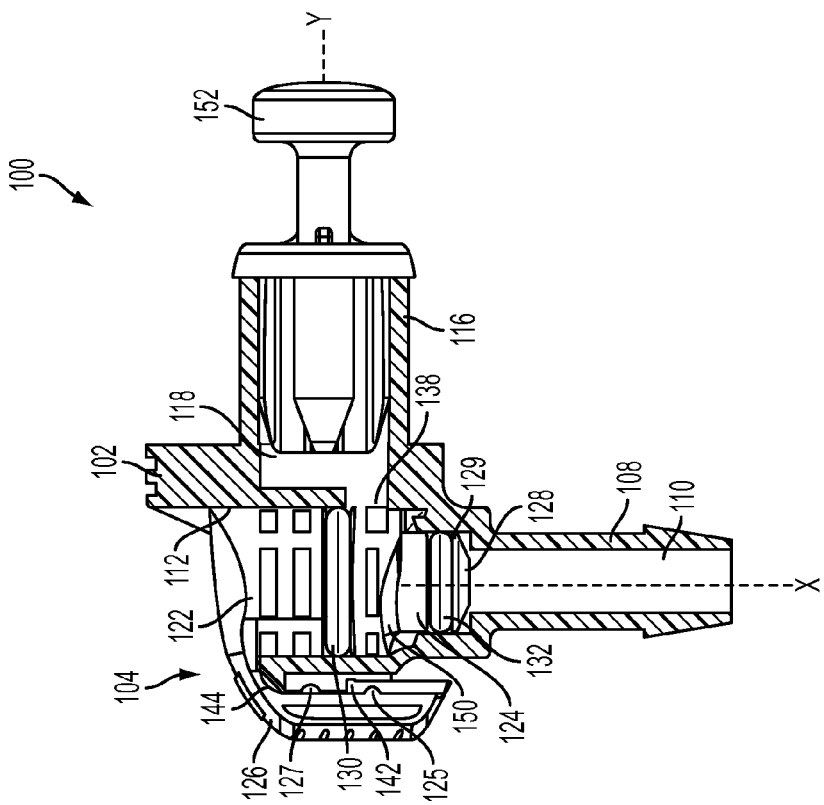
FIG. 2 is a side view of the valve of FIG. 1 in a closed configuration, with the valve housing shown in cross-section.

Disclosed herein are exemplary embodiments of valves for drinking from a portable fluid container. Disclosed valves allow for manual actuation of the valve between an open configuration that permits fluid flow and a closed configuration that substantially prevents fluid flow. Disclosed valves comprise a valve housing having inner bore fluidly coupled to an inflow channel and an outflow channel that are angled with respect to one another, and a reciprocating valve member that is adjustably positioned partially within the bore to open and close the fluid flow pathway through the bore from the inflow channel to the outflow channel. The reciprocating valve member is sized and shaped such that it can prevent fluid flow when fully inserted within the bore to a closed configuration, and can allow fluid flow when the valve member is retracted from this fully inserted, closed position by a relatively short distance to an open configuration.

In the closed configuration, the lower end of the valve member is positioned within a lower chamber of the bore, such that a sealing portion of the lower portion (such as a lower O-ring) can function to prevent fluid flow from the inflow channel into the bore. In the open configuration, the valve member is retracted upward from this closed position, such that the sealing portion of the lower portion is withdrawn from the lower chamber into an upper chamber of the bore having a greater diameter such that the seal is broken and fluid flow is allowed through the bore. The upper chamber of the bore can be substantially wider than the lower portion (e.g., have a larger diameter), such that fluid can flow within the upper chamber around the perimeter of the lower portion of the valve member. The fluid can exit the upper chamber into the outlet channel.

FIGS. 1-3 and 6 show an exemplary valve 100 that comprises a valve housing 102 and a reciprocating valve member 104. An optional bite valve 105 (FIG. 3) comprising a stem 152 and a flexible sheath 154 can be coupled to the valve 100 at the outlet portion 116.

Figure 1:
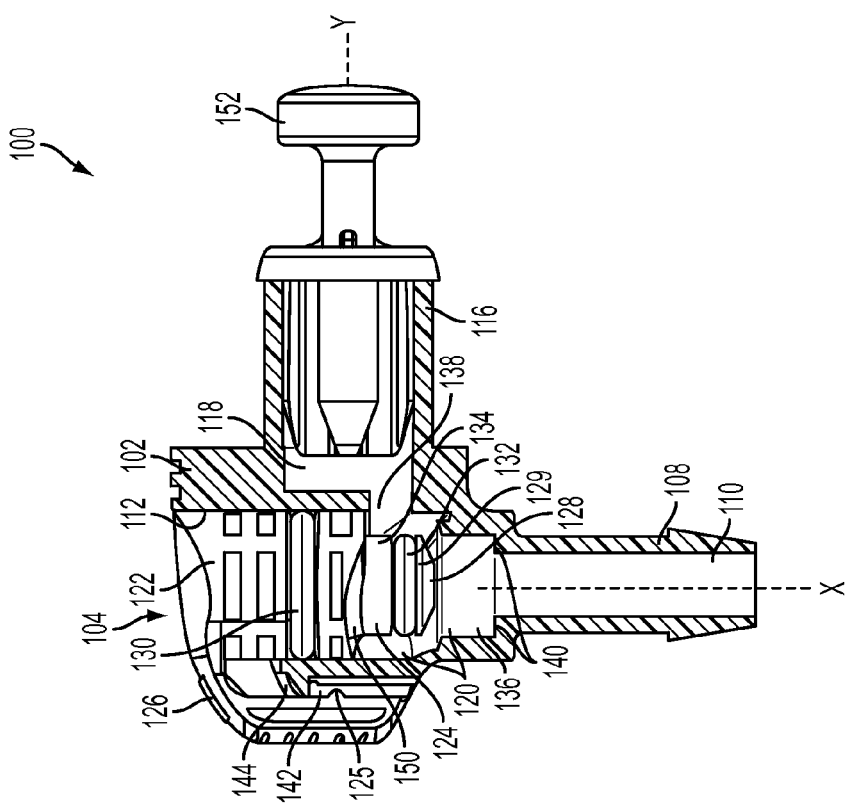
FIG. 1 is a side view of an exemplary valve in an open configuration, with a valve housing shown in cross-section.
Figure 3:
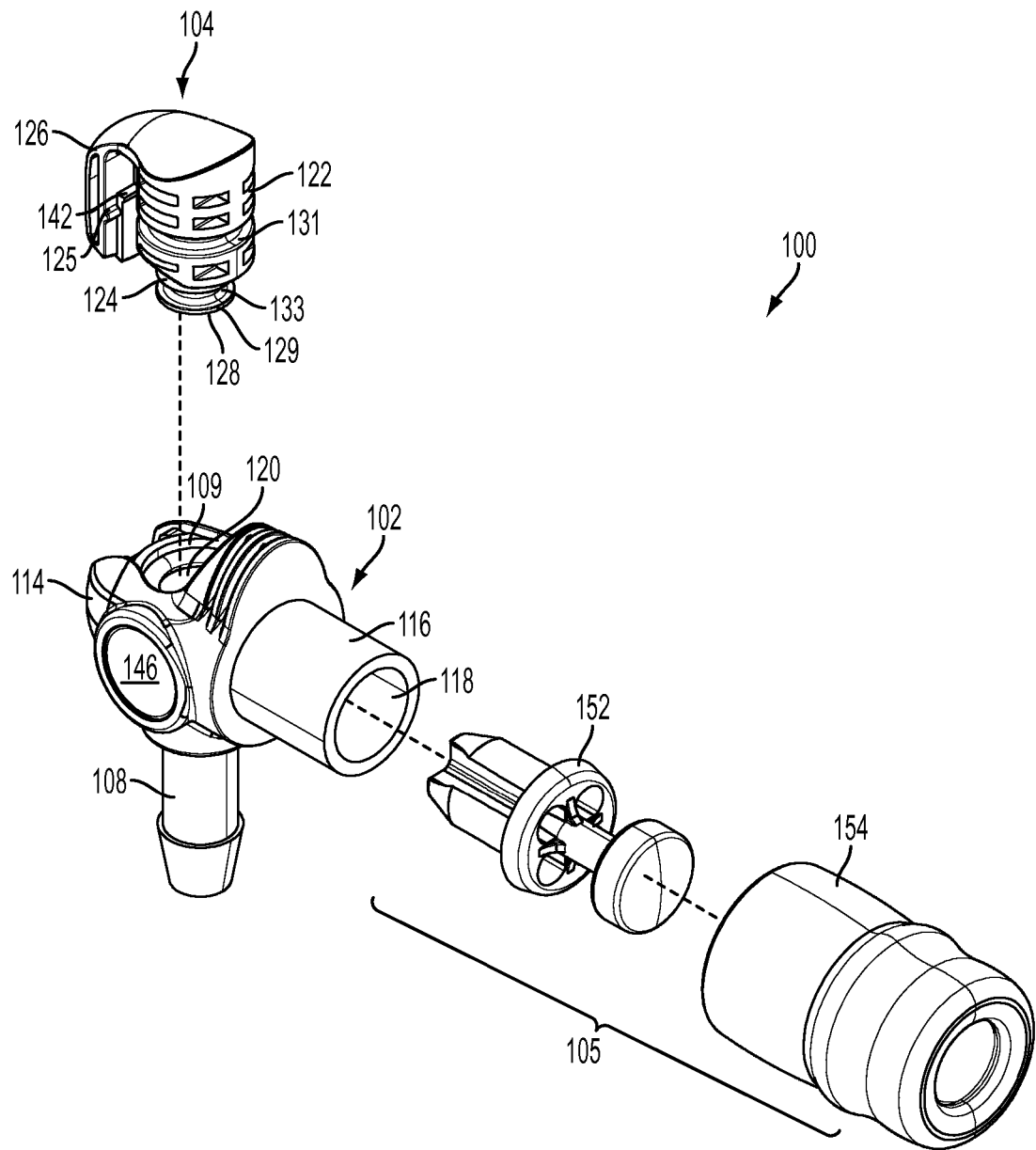
FIG. 3 is an exploded, perspective view of the valve of FIG. 1.

The valve housing 102 can comprise a fluid inlet portion 108 having an inflow channel 110, a fluid outlet portion 116 having a outflow channel 118, and a bore 120 that receives the reciprocating valve member 104. The bore 120 includes a lower chamber 136, and upper chamber 134, and an upper opening 109 for insertion of the valve member 104 into the bore 120. The valve housing 102 further comprises a rear portion 114 that engages with an outer arm 126 of the valve member 104 to lock the valve member in the open and close positions. As shown in FIGS. 1-2, the inflow channel 110 can define an X-axis and the outflow channel 118 can define a Y-axis that is angled relative to the X-axis, such as at a substantially right angle.

The valve member 104 can comprise a generally cylindrical upper portion 122 having a greater diameter, a generally cylindrical lower portion 124 having a relatively smaller diameter, and an outer arm 126 for controlling the vertical position of the valve member 104. The lower portion 124 can comprise a valve disc 128 at its lower end. The upper portion 122 comprise an upper O-ring 130 seated in an upper annular groove 131, and the lower portion 124 can comprise a lower O-ring 132 seated in a lower annular groove 133 extending around the valve member 104. The lower O-ring 132 can have a smaller diameter than the upper O-ring 130.

The lower chamber 136 of the bore 120 can comprise an annular lower ledge 140 (FIG. 6) located at the junction of the inflow channel 110 and the lower chamber 136, which contacts the lower surface of the valve disk 128 to limit the downward motion of the valve member 120 in the closed position, and/or helps seal off the inflow channel 110 in the closed position. The disk 128 can be tapered or beveled, as illustrated, such that the disk contacts the inner edge of the ledge 140 when the valve member 104 is in the closed position (FIG. 2). The lower chamber 136 also has a sidewall 141 (FIG. 6) that is in sealing contact with the outer perimeter of the lower O-ring 132 in the closed position to prevent fluid flow through the lower chamber 136.

The upper chamber 134 includes a sidewall 112 that remains in sealing contact with the outer perimeter of the upper O-ring 130 in the both the open position and the closed position, and intermediate positions, to prevent fluid leakage from the upper chamber 134 out through the upper opening 109 of the bore. The upper chamber 134 is fluidly coupled to the outflow channel 118 through an aperture 138 extending through the sidewall 112. The aperture 138 and the channel 118 together form a fluid outlet of the housing 102. The aperture 138 can be referred to as a first portion of the fluid outlet and the channel 118 can be referred to as a second portion of the fluid outlet. The aperture 138 is positioned below the level of the upper O-ring 130 in the open position and optionally also in the closed position, such that the upper O-ring 130 does not occlude the aperture 138.

As shown in FIG. 1, the aperture 138 can have a height (in the direction of the X-axis) that is less than the diameter of the outlet channel 118. The aperture 138 can be semi-circular, semi-elliptical, crescent shaped, circular, elliptical, or have other non-circular cross-sectional shapes. The channel 118 can be generally cylindrical with a circular cross-sectional shape, or can have other shapes. The lower edge of the aperture 138 can share the same curvature and shape with the lower surface of the outlet channel 118, while the upper edge of the aperture 138 can be generally horizontal and follow the circumferential curvature of the sidewall 112 of the upper chamber 134. The height of the aperture 138 can be relatively small such that the valve member 104 does not have to move very far between the open and closed positions. For example, the height of the aperture 138 can be less than a radius of the upper chamber 130 and/or less than the radius of the lower chamber 132.

FIG. 2 shows the valve 100 in a closed configuration, with the valve member 104 in a fully depressed position within the bore 120. With the valve member 104 in this depressed position, fluid can flow from a fluid source into the inflow channel 110, but is prevented from entering the upper chamber 134 of the bore 120. The lower O-ring 132 seals with the sidewall 141 of the lower chamber 136 to prevent fluid from reaching the upper chamber 134. In some embodiments, the upper portion 122 of the valve member 104 can block off the aperture 138 in the closed position, to further block fluid flow. In some embodiments, in a closed configuration, fluid is also prevented from entering the lower chamber 136 of the bore 120.

FIG. 1 shows the valve 100 in the open configuration. In this position, the lower O-ring 132, and optionally also the disk 128, is raised above the sidewall 141 of the lower chamber 136 and is positioned within the upper chamber 130 and spaced radially inside of the sidewall 112 of the upper chamber 130, such that fluid can flow through the lower chamber and between the lower O-ring 132 and the sidewall 112 toward the aperture 138. Thus, in the open position, the inflow channel 110 is in fluid communication with the lower chamber 136, which is in fluid communication with the upper chamber 134, which is in fluid communication with the outflow channel 118 via the aperture 138. The valve member 104 can be positioned between the open and closed positions shown in FIGS. 1 and 2 and still permit the flow of fluid through the valve 100, with varying degrees of flow restriction.

While the lower O-ring 132 no longer obstructs the flow of fluid in the open position, the upper O-ring 130 (positioned above the level of the aperture 138) can continue to seal against the upper sidewall 112, preventing fluid from leaking upwards within the upper chamber 134 towards the opening 109.

Figure 6:
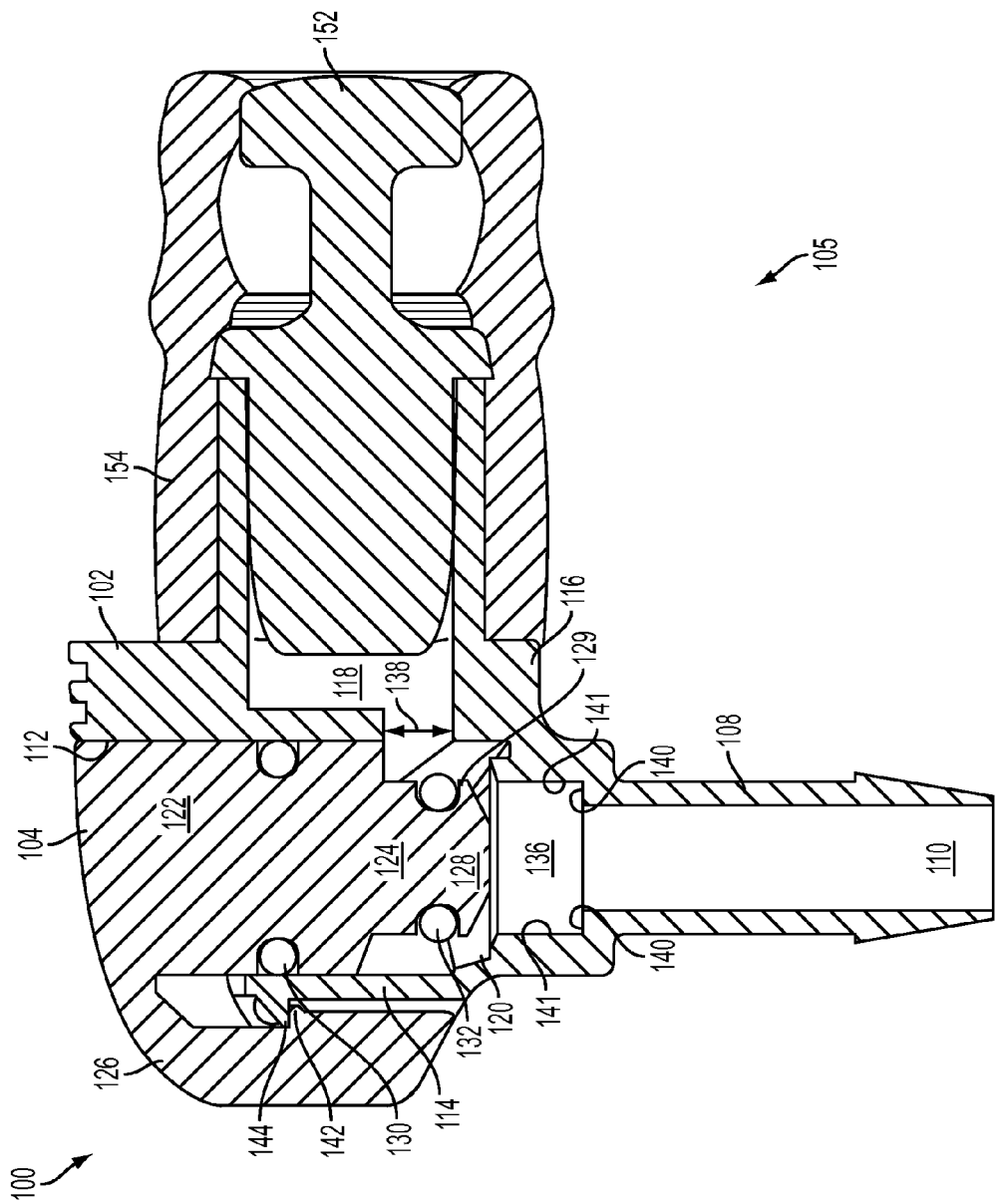
FIG. 6 is a cross-sectional side view of the valve of FIG. 1, including a bite valve attached to an outlet portion of the valve housing.

As shown in FIGS. 1-2 and 6, the diameter of the upper portion 122 can be approximately equal to the diameter of the upper chamber 134, and the diameter of the lower portion 124 can be approximately equal to the diameter of the lower chamber 136. In some embodiments, the outer diameters of the upper O-ring 130 and lower O-ring 132 are substantially equal to the diameters of the upper chamber 134 and lower chamber 136, respectively, while the diameters of other portions of the valve member 104 can vary.

The valve member 104, the channels 110, 118, O-rings 130, 132, and/or the chambers 134, 136 can be shaped substantially cylindrically as shown, but can also be substantially non-cylindrical in other embodiments, such as having an elliptical or polygonal cross section.

Figure 4:
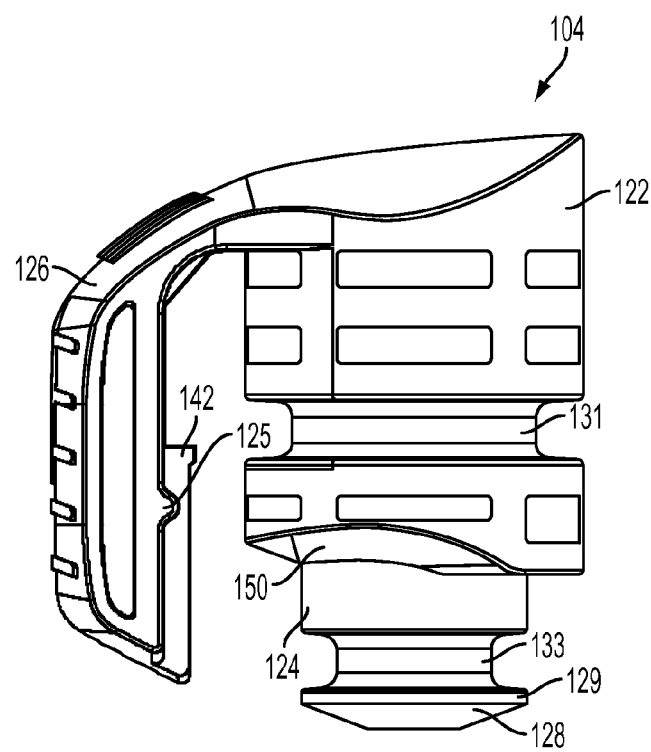
FIG. 4 is a side view of a reciprocating valve member of the valve of FIG. 1.

As shown in FIGS. 1, 2, and 4, the lower end of the upper portion 122 of the valve member 104 can include an irregular surface 150 that extends at least partially around the circumference of the valve member. The surface 150 can be cut-away, recessed, rounded, beveled, tapered, or otherwise shaped to form a non-right angle between the vertical side of the upper portion 122 and the lower end of the upper portion. The surface 150 can extend around the rear and lateral sides of the upper portion, for example, while the front side of the upper portion (facing the aperture 138) has a generally cylindrical shape that forms a right angle with the lower surface of the upper portion. The surface 150 can undulate, or otherwise vary in vertical position and slope moving circumferentially around the valve member 104. The presence of the surface 150 instead of a right-angled cylindrical surface can result in increased open volume in the bore below the upper portion 122. This can provide increased fluid space below upper O-ring 130 such that during valve closure, fluid trapped between the upper and lower O-rings can occupy this space rather that traveling upward past the upper O-ring and leaking out of the valve 100.

As shown in FIGS. 1-2 and 6, the arm 126 of the valve member 104 can be slidably coupled to the rear portion 114 of the housing 102 to allow the user to adjust the position of the valve member 104 up or down relative to the valve housing 102. The arm 126 can project rearwardly and downwardly from the top of the valve member 104, and can comprise ridges or other frictional features such that the user can engage the arm and transmit sufficient force to adjust the position of the valve member 104.

The arm 126 can comprise one or more features, such as projecting elements or grooves, which can engage corresponding features on the rear portion 114 of the housing 102 to set the valve member 104 at different vertical positions relative to the housing, including the open position and the closed position. For example, the rear portion 114 can have a plurality of recesses 127 (see FIG. 2) that are spaced apart vertically and the forward side of the arm 126 can include projecting element(s) 125 that are received at selected ones of the recesses 127 to determine the vertical position of the valve member 104.

Figure 5:
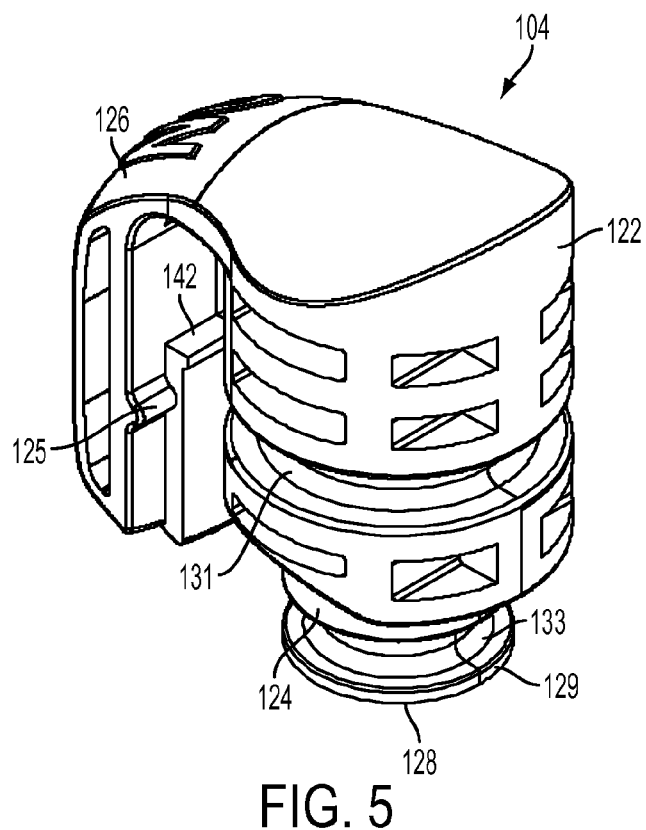
FIG. 5 is a perspective view of the reciprocating valve member of FIG. 4.

As best shown in FIG. 5, the arm 126 can include two projections 125 (the second projection is not visible in this view) spaced apart horizontally on the forward surface of the arm 126. In such embodiments, the rear portion 114 of the housing 102 can comprise multiple pairs of complementary recesses 127 for accommodating the projections 125, each pair being at different vertical levels along the rear portion 114.

In some embodiments, the features are reversed, such that the rear portion 114 comprises projection(s) which are configured to engage with corresponding depressions on the arm 126. In some embodiments, the rear portion 114 and/or arm 126 can comprise multiple sets of projections (e.g., multiple pairs of projections), such that only a single set of compatible depressions is required on the other.

The rear portion 114 of the housing 102 can comprise an upper lip 144 (FIG. 6) projecting rearwardly (in the direction of the arm 126), which can prevent the reciprocating valve member 104 from dislodging from the valve housing 102 and/or limit the upward motion of the valve member at the opening position. The valve member 104 can comprise a ledge 142, which can be located between the protrusions 125 for example (as shown in FIG. 5), and which can contact lip 144 in the open position to prevent the valve member 104 from further upward motion.

In some embodiments, the valve member 104 can be removed from the valve housing 102 (such as for cleaning) by resiliently bending the arm 126 rearwardly (away from the rear portion 114) a sufficient distance, such that the top of the ledge element 142 clears the lip 144. Similarly, the valve member 104 can be inserted into the housing 102 by temporarily deflecting the arm rearwardly enough to allow the ledge 142 to pass around the lip 144.

In some embodiments, the valve 100 can be configured such that fluid flows in a reverse direction to that described above, such that fluid flows from a fluid source into the outflow channel 118, and then through the bore 120, out the inflow channel 110, and to the user. In some embodiments, the valve 100 is reversible such that a user can selectively orient the valve 100 relative to a fluid source to allow fluid to enter the valve 100 from either the inlet portion 108 or the outlet portion 116.

In some embodiments, a user can drink directly from the valve 100, while in other embodiments the valve 100 is fitted with a tube or other means to conduct fluid away from the valve 100 and towards the user. For example, the outlet portion 116 at a proximal end of the outflow channel 118 can be fitted with a tube or other means to conduct fluid away from the valve 100 and towards the user.

A bite valve 105 (FIG. 6) can be fitted around the outlet portion 116. When the valve 100 is open, a user may manipulate the bite valve 105 to selectively permit fluid flow to the user. The bite valve 105 can comprises a rigid stem 152 and a resiliently flexible sheath 154, or other configurations. Exemplary bite valve embodiments for use with the valves disclosed herein are described, for example, in U.S. Pat. No. 6,039,305, which is hereby incorporated by reference. The outlet portion 116 can also, or alternatively, be fitted with a squirt valve that opens with sufficient forward fluid pressure. Other types of valves can alternatively be coupled to the outlet portion 116 of the valve 100 and/or to the inlet 108 of the valve 100.

The valve housing 102 and/or the reciprocating valve member 104 can be made of polymeric material, metal, and/or any other sufficiently rigid materials.

In some embodiments, the valve 100 can comprise magnets or magnetic metal 146 on one or both lateral sides of the housing 102 (see FIG. 3) for releasably attaching the valve 100 to a complementary magnetic surface. This magnetic surface may be located on an item worn by a user, such as shoulder strap of a fluid reservoir, such that the valve 100 can attached to the magnetic surface and stored at a convenient location when not in use. The magnetic surface can also be located on a bicycle or other exercise equipment, such as in the vicinity of a handlebar of a bicycle. In such uses, the valve 100 typically is connected to a fluid container by a flexible conduit (e.g., a plastic tube), on end of which can be extended over the inlet portion 108. Instead of magnetic materials, the valve 100 can also comprise a variety of other non-magnetic attachment means as known to those skilled in the art, such as hook-and-loop fasteners or mechanical fasteners, to releasably attach the valve 100 to another surface when not in use.

In view of the many possible embodiments to which the principles disclosed herein may be applied, it should be recognized that illustrated embodiments are only examples and should not be considered a limitation on the scope of the disclosure. Rather, the scope of the disclosure is at least as broad as the scope of the following claims. I therefore claim all that comes within the scope of these claims.

The invention claimed is:

1. A valve for a drinking container, the valve comprising:
    a housing and a valve member adjustably coupled to the housing;
    wherein the housing comprises a fluid inlet, a bore having a lower chamber and an upper chamber, and a fluid outlet;
    wherein the fluid inlet, the bore lower chamber, and the bore upper chamber are aligned along a central axis, and the fluid outlet extends laterally from the bore upper chamber in a direction transverse to the central axis;
    wherein the bore upper chamber is larger in diameter than the bore lower chamber, and the bore lower chamber is larger in diameter than the fluid inlet;
    wherein the bore upper chamber has an open upper end for receiving the valve member;
    wherein the valve member comprises a lower body having a lower sealing member sized to seal within the bore lower chamber, and the valve member comprises an upper body having an upper sealing member sized to seal within the bore upper chamber;
    wherein the valve member is adjustable relative to the housing in axial directions of the central axis between an open position and a closed position;
    wherein when the valve member is in the closed position, the upper sealing member is in sealing contact with the bore upper chamber and the lower sealing member is in sealing contact with the bore lower chamber, such that fluid entering the fluid inlet cannot flow through the bore lower chamber into the bore upper chamber or into the fluid outlet; and
    wherein when the valve member is in the open position, the upper sealing member remains in sealing contact with the bore upper chamber and the lower sealing member is positioned above the bore lower chamber and in the bore upper chamber, such that fluid can flow from the fluid inlet, through the bore lower chamber, through the bore upper chamber around the lower sealing member, and into the fluid outlet, but fluid is prevented from leaking through the open upper end of the bore upper chamber; and
    the valve further comprising a bite valve positioned at the fluid outlet, the bite valve being operative in conjunction with the valve member to regulate fluid flow.

2. The valve of claim 1, wherein the valve member further comprises an arm extending from the upper body outside of the housing, and the arm is engagable with an outer surface of the housing in at least two different positions, including a first position to hold the valve member in the closed position, and a second position to hold the valve member in the open position.

3. The valve of claim 2, wherein the valve member can be moved from the open position to the closed position by pressing down on the valve member in a direction of the central axis, and the valve member can be moved from the closed position to the open position by lift or pushing up on the arm.

4. The valve of claim 2, wherein the arm and the outer surface of the housing comprise interfitting engagement features that allow the arm to engage with the housing and hold the valve body relative to the housing in the open position and the closed position.

5. The valve of claim 2, wherein the housing and the arm include interfering features that prevent the valve member from being removed from the housing absent substantial deformation of the arm or the housing.

6. The valve of claim 1, wherein the upper sealing member comprises an O-ring seated in an annular recess in the upper body, and the lower sealing member comprises an O-ring seated in an annular recess in the lower body.

7. The valve of claim 1, wherein the lower body of the valve member comprises a tapered valve disk at a lower end of the lower body, and when the valve member is in the closed position the valve disk covers an upper end of the fluid inlet at a junction between the fluid inlet and the bore lower chamber.

8. The valve of claim 1, wherein, when the valve member is in the closed position, a lateral wall of the upper body below the upper sealing member blocks the fluid outlet at a junction between the bore upper chamber and the fluid outlet.

9. The valve of claim 1, wherein the bite valve comprises a rigid stem and a flexible sheath mounted around the stem, such that the sheath seals against the stem in a natural state to block fluid flow out of the fluid outlet, and such that the sheath separates from the stem to allow fluid flow out of the fluid outlet when a user bites down on the sheath.

10. The valve of claim 1, wherein, when the valve member is in the open position, fluid flowing through the fluid outlet moves in a direction that is substantially perpendicular to fluid flowing through the fluid inlet.

11. The valve of claim 1, wherein the valve member moves a first distance in the axial direction between the open position and the closed position, and the first distance is less than a radius of the bore upper chamber and less than a diameter of the bore lower chamber.

12. The valve of claim 1, wherein the fluid outlet comprises a first portion adjacent to the bore upper chamber and a second portion through which fluid exits the housing, wherein a height of the first portion in the direction of the central axis is less than a height of the second portion in the direction of the central axis.

13. The valve of claim 12, wherein the first portion of the fluid outlet has a non-circular cross-section and the second portion of the fluid outlet has a circular cross-section.

14. A valve for a drinking container, the valve comprising:
a housing and a valve member adjustably coupled to the housing;
wherein the housing comprises a fluid inlet, a bore having a lower chamber and an upper chamber, and a fluid outlet;
wherein the fluid inlet, the bore lower chamber, and the bore upper chamber are aligned along a central axis, and the fluid outlet extends laterally from the bore upper chamber in a direction transverse to the central axis;
wherein the bore upper chamber is larger in diameter than the bore lower chamber;
wherein the valve member comprises a lower body having a lower sealing member sized to seal within the bore lower chamber, and the valve member comprises an upper body having an upper sealing member sized to seal within the bore upper chamber;
wherein the valve member is adjustable relative to the housing in axial directions of the central axis between an open position and a closed position;
wherein when the valve member is in the closed position, the lower sealing member is in sealing contact with the bore lower chamber, such that fluid entering the fluid inlet cannot flow through the bore lower chamber into the bore upper chamber or into the fluid outlet;
wherein when the valve member is in the open position, the upper sealing member is in sealing contact with the bore upper chamber to prevent fluid leakage and the lower sealing member is positioned above the bore lower chamber and in the bore upper chamber, such that fluid can flow from the fluid inlet, through the bore lower chamber, through the bore upper chamber around the lower sealing member, and into the fluid outlet; and
the valve further comprises a bite valve adjacent the fluid outlet of the housing, the bite valve being operative in conjunction with the valve member to regulate fluid flow.

15. The valve of claim 14, wherein the bite valve comprises a rigid stem and a flexible sheath mounted around the stem, such that the sheath seals against the stem in a natural state to block fluid flow out of the fluid outlet, and such that the sheath separates from the stem to allow fluid flow out of the fluid outlet when a user bites down on the sheath.

16. A valve for a drinking container, the valve comprising:
a housing and a valve member adjustably coupled to the housing;
wherein the housing comprises a fluid inlet, a bore having a lower chamber and an upper chamber, and a fluid outlet;
wherein the fluid inlet, the bore lower chamber, and the bore upper chamber are aligned along a central axis, and the fluid outlet extends laterally from the bore upper chamber in a direction transverse to the central axis;
wherein the bore upper chamber is larger in diameter than the bore lower chamber, and the bore lower chamber is larger in diameter than the fluid inlet;
wherein the bore upper chamber has an open upper end for receiving the valve member;
wherein the valve member comprises a lower body having a lower sealing member sized to seal within the bore lower chamber, and the valve member comprises an upper body having an upper sealing member sized to seal within the bore upper chamber;
wherein the valve member is adjustable relative to the housing in the directions of the central axis between an open position and a closed position;
wherein when the valve member is in the closed position, the upper sealing member is in sealing contact with the bore upper chamber and the lower sealing member is in sealing contact with the bore lower chamber, such that fluid entering the fluid inlet cannot flow through the bore lower chamber into the bore upper chamber or into the fluid outlet; and
wherein when the valve member is in the open position, the upper sealing member remains in sealing contact with the bore upper chamber and the lower sealing member is positioned above the bore lower chamber and in the bore upper chamber, such that fluid can flow from the fluid inlet, through the bore lower chamber, through the bore upper chamber around the lower sealing member, and into the fluid outlet, but fluid is prevented from leaking through the open upper end of the bore upper chamber;
wherein the fluid outlet comprises a first portion adjacent to the bore upper chamber and a second portion through which fluid exits the housing, wherein a height of the first portion in the direction of the central axis is less than a height of the second portion in the direction of the central axis; and
wherein the first portion of the fluid outlet has a non-circular cross-section and the second portion of the fluid outlet has a circular cross-section.

17. The valve of claim 16, wherein the valve member further comprises an arm extending from the upper body outside of the housing, and the arm is engagable with an outer surface of the housing in at least two different positions, including a first position to hold the valve member in the closed position, and a second position to hold the valve member in the open position.

18. The valve of claim 17, wherein the valve member can be moved from the open position to the closed position by pressing down on the valve member in a direction of the central axis, and the valve member can be moved from the closed position to the open position by lift or pushing up on the arm; and wherein the arm and the outer surface of the housing comprise interfitting engagement features that allow the arm to engage with the housing and hold the valve body relative to the housing in the open position and the closed position.

19. The valve of claim 16, wherein the lower body of the valve member comprises a tapered valve disk at a lower end of the lower body, and when the valve member is in the closed position the valve disk covers an upper end of the fluid inlet at a junction between the fluid inlet and the bore lower chamber.

20. The valve of claim 16, wherein, when the valve member is in the closed position, a lateral wall of the upper body below the upper sealing member blocks the fluid outlet at a junction between the bore upper chamber and the fluid outlet; and when the valve member is in the open position, fluid flowing through the fluid outlet moves in a direction that is substantially perpendicular to fluid flowing through the fluid inlet.

* * * * *